(12) United States Patent
Quigley et al.

(10) Patent No.: US 8,355,706 B2
(45) Date of Patent: *Jan. 15, 2013

(54) METHOD AND SYSTEM FOR UTILIZING CONTEXT DATA TAGS TO CATALOG DATA IN WIRELESS SYSTEM

(75) Inventors: Thomas Quigley, Franklin, NC (US); Alexander G. MacInnis, Ann Arbor, MI (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1052 days.

This patent is subject to a terminal disclaimer.

(21) Appl. No.: 11/968,560

(22) Filed: Jan. 2, 2008

(65) Prior Publication Data

US 2009/0024641 A1  Jan. 22, 2009

Related U.S. Application Data

(60) Provisional application No. 60/950,932, filed on Jul. 20, 2007.

(51) Int. Cl.
*H04L 29/06* (2006.01)

(52) U.S. Cl. .................. 455/414.3; 455/456.3; 455/418; 455/411

(58) Field of Classification Search .......... 455/418–420, 455/414.1–414.3, 3.01, 3.06, 456.3; 709/203–206; 715/745

See application file for complete search history.

(56) References Cited

U.S. PATENT DOCUMENTS

| | | | | |
|---|---|---|---|---|
| 8,027,668 B2 * | 9/2011 | Behzad et al. | ............. | 455/414.3 |
| 8,108,406 B2 * | 1/2012 | Kenedy et al. | ................ | 707/749 |
| 2005/0021369 A1 * | 1/2005 | Cohen et al. | ...................... | 705/2 |
| 2005/0289469 A1 * | 12/2005 | Chandler et al. | .............. | 715/745 |
| 2007/0190494 A1 * | 8/2007 | Rosenberg | ....................... | 434/11 |
| 2008/0195664 A1 * | 8/2008 | Maharajh et al. | ........... | 707/104.1 |
| 2008/0242279 A1 * | 10/2008 | Ramer et al. | ................ | 455/414.2 |
| 2009/0023432 A1 * | 1/2009 | MacInnis et al. | ............. | 455/418 |
| 2009/0023433 A1 * | 1/2009 | Walley et al. | ................. | 455/418 |
| 2010/0030578 A1 * | 2/2010 | Siddique et al. | .................. | 705/3 |
| 2010/0169313 A1 * | 7/2010 | Kenedy et al. | ................ | 707/736 |
| 2010/0180029 A1 * | 7/2010 | Fourman | ...................... | 709/225 |

OTHER PUBLICATIONS

Seagate Technology LLC, Seagate D.A.V.E. (Digital Audio Video Experience) Transform the consumer digital content experience with the Seagate D.A.V.E design concept, Data Sheet, 2007.
Seagate Technology LLC, Seagate D.A.V.E. (Digital Audio Video Experience) The portable storage platform that collects, plays and manages digital content, Product Overview, 2007.

* cited by examiner

*Primary Examiner* — Sharad Rampuria
(74) *Attorney, Agent, or Firm* — Thomas | Horstemeyer, LLP

(57) ABSTRACT

A Wireless mobile communication (WMC) device may maintain user preference information, which is unique to the WMC device capabilities and the device user. The WMC device may modify and/or update the user preference information based on device use and information ascertained from applications running on the WMC device itself; for example scheduling applications. The user preference information may be utilized to create context data tags for generated data on the WMC device. Context data tags may comprise such information as time/date stamping, subject information, and/or or location information. The context data tags may be utilized to tag the generated data, enabling continuous and improved cataloging. Improved cataloging may enable improved searchability of tagged data. Tagged data alternatively and/or additionally may be transferred and stored in a remote device for improved and secure back-up storage. The remote device may utilize context data tags for cataloging and storing received data.

21 Claims, 6 Drawing Sheets

METHOD AND SYSTEM FOR UTILIZING CONTEXT DATA TAGS TO CATALOG DATA IN WIRELESS SYSTEM

CROSS-REFERENCE TO RELATED APPLICATIONS/INCORPORATION BY REFERENCE

This patent application makes reference to, claims priority to and claims benefit from U.S. Provisional Application Ser. No. 60/950,932 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for utilizing context data tags to catalog data in a wireless system.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services comprise such features as text messaging, audio/video streaming, and web browsing.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, cellular technology may allow use of the mobile phone as a form of wireless modem that allows connecting a laptop, for example, to the internet via a cellular network.

Devices aimed at taking advantage of the capabilities of wireless networks may be described as wireless mobile communication (WMC) devices. Today's WMC devices may comprise such devices as cellular phones, PDA's, laptops, and/or other devices.

Most WMC devices nowadays offer more than simple communicative operations. These WMC devices, in addition to providing peer-to-peer communication functions, may allow their users expansive list of personal services and utilities. Some WMC devices may enable a broad scope of gaming, scheduling, task-organizational and/or other services. Additionally, more applications that traditionally were limited to non-wireless and/or non-mobile devices may be used in conjunction with WMC devices. For example, email applications such as Microsoft Outlook® are finding their way to more WMC devices. Other applications that have gained popularity in recent years comprise audio/video applications such as still and moving picture recording application and voice recording applications. These added capabilities and/or applications are slowly turning WMC devices into indispensable on-the-move personal assistant.

However, the promising potential of WMC devices' uses beyond simple communicative operations remains stagnant because of some limitations in the devices themselves, which may include such limitations as power, storage, and/or processing. Also, while significant work has been put into expanding WMC devices' potential utility, not much work has been put into convening these new utilities for their users. For example, while the WMC devices offer impressive array of recording, organizing, and tracking services, very little effort has been made to facilitate convenient use of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing context data tags to catalog data in a wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing context data tags to catalog data in a wireless system. Wireless devices may be utilized to perform a plurality of jobs; and in doing so, the wireless devices may generate data. For example, a wireless mobile device may be utilized to record a conversion, take a picture and/or capture video clip. Subsequently, an audio, video, and/or other type of multimedia data file may be generated. While such concepts as time and/or date stamping have and are currently being used, various embodiments of the invention provide a mechanism, which may, for example, be utilized to automatically capture and tag multimedia events with context based information to enable cataloging. The capture, tagging and/or cataloguing may enable more enhanced and/or intelligent search options and operations.

Figure 1:
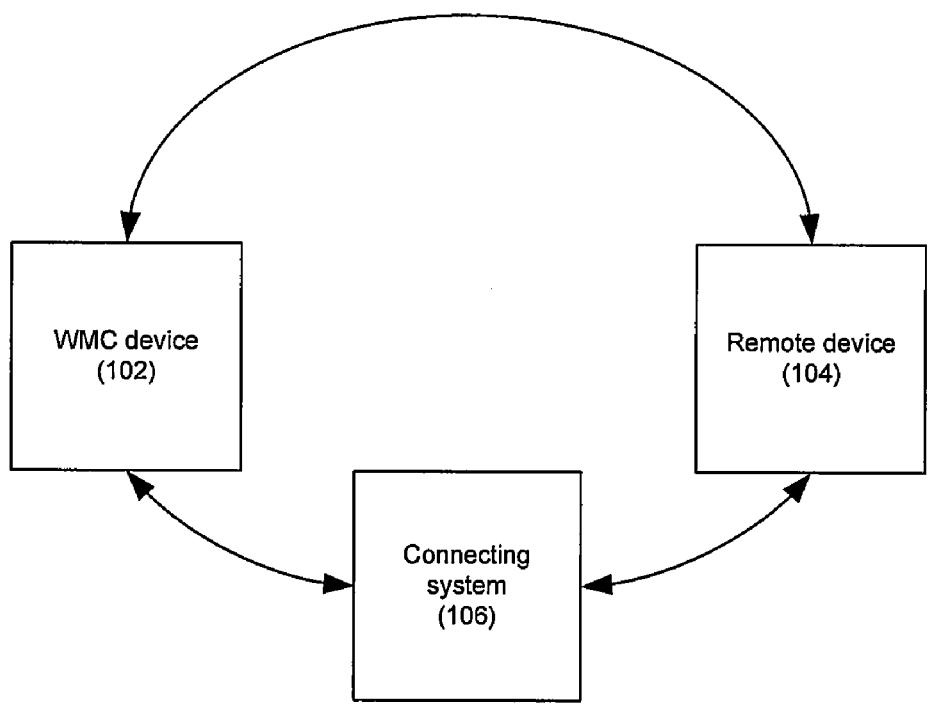
FIG. 1 is a block diagram that illustrates an exemplary communication setup between a wireless mobile communication (WMC) device and a remote device, which may utilize context data tags to catalog data, in accordance with an embodiment of the invention.

FIG. 1 is a block diagram that illustrates an exemplary communication setup between a wireless mobile communication (WMC) device and a remote device, which may utilize context data tags to catalog data, accordance with an embodiment of the invention. Referring to FIG. 1, there is shown a Wireless mobile communication (WMC) device 102, a remote device 104, and a connecting system 106.

The WMC device 102 may comprise suitable hardware, logic, circuitry and/or code that may enable performing wireless mobile communication. For example, the WMC device 102 may be utilized to perform voice, video and/or text message peer-to-peer communication. The WMC device 102 may also comprise suitable hardware, logic, circuitry and/or code that may enable performing additional functionality comprising Internet browsing, video streaming, and/or audio recording. For example, the WMC device 102 may comprise a digital camera that may enable generating sill pictures and/or video streams. Also, the WMC device may comprise a microphone that may enable generating audio recordings.

The remote device 104 may comprise suitable logic, circuitry and/or code that may be enabled to communicate to with the WMC device 102. The invention may not be limited to a specific remote device, but may comprise for example, a general purpose processing device, a specialized processing device, and/or a specialized peripheral device which may be enabled to perform various jobs and/or tasks that may be requested by the WMC device 102. For example, the remote device 104 may comprise a home PC that may be enabled to performed fast processing operations due to fast processing subsystems and increased memory space. Such home PC may be better suited to perform processing and/or storage intensive tasks. For instance, where necessary and/or feasible, the WMC device 102 may utilize the remote device 104 to perform Internet searches and/or for secure storage of data that may be created and/or maintained in the WMC device 102.

The connecting system 106 may comprise a plurality of interconnecting networks and suitable hardware, logic, circuitry and/or code that may be enabled to facilitate end-to-end communication between the WMC device 102 and the remote device 104. The connecting system 106 may comprise wireless and/or wired networks that may be enabled to communicate and forward messaging and/or data between the WMC device 102 and the remote device 104. The connecting system 106 may be utilized to provide a transport and/or switching fabric that may facilitate communication between the WMC device 102 and the remote device 104.

In operation, the WMC device 102 may communicate with the remote device 104 through the connecting system 106, or alternatively, where possible, the WMC device 102 may communicate directly with the remote device 104.

The WMC device 102 may be utilized for non-communicative tasks. For example, the WMC device may be utilized to create video, audio, and/or other types of multimedia data files. In order to provide convenient usability, searchability and/or storage of created and/or maintained multimedia data files, the WMC device 102 may generate context data tags, which may be utilized to tag multimedia data file based on their contents. For example, a WMC device 102 may be enable to tag the content of picture files while they are being generated or after the files have been generated. Rather than having to compare picture files based on their content (actually comparing pictures), the WMC device 102 may be utilized to create context based tags that may identify such picture files allowing quick and convenient searchability of the files. The context data tags may include information about the content of the data file and/or information that may help identify and/or cataloging the multimedia data files. For example, a context data tag of a picture file may comprise information such as location, date, name of person(s) in the picture, and/or information pertaining to subject of the picture file. Therefore, when storing and or searching through picture files, it may suffice to simply examine the corresponding context data tags. The location information may identify a location where a multimedia data file was created and/or accessed. For example, the location information in a context data tag of a digital picture may indicate that the picture was taken in New York City, and thus it may suffice to read out that information rather than having to view the content of the digital picture. The subject information may identify information pertaining to circumstances when a multimedia data file was created and/or accessed. For example, the subject information in a context data tag of a digital picture may indicate that the picture was taken during a business meeting. Such subject information may be derived from the contents of the multimedia data file itself, or it may be derived from other applications utilized in the WMC device 102 when the multimedia file was created and/or accessed. For example, calendar applications such as Microsoft Outlook® may be utilized, with other relevant information such as data and/or time information, to create context data tag for a digital picture, which may indicate that the digital picture was taken during a business meeting with persons X and Y in New York City.

The WMC device 102 may utilize context data tags to catalog multimedia data files. The WMC device 102 may utilize information that may be included in context data tags for cataloging purposes. For example, the WMC device 102 may catalog digital pictures generated and/or accessed in the WMC device 102 based on subject information that may be included in the multimedia data files' context data tags wherein digital pictures pertaining to business meetings may be cataloged separately from digital pictures whose context data tags may indicate that they were not business-related.

In accordance with an embodiment of the invention, the context data tags may be generated dynamically. Creating and/or updating context data tags may utilize, for example, user preference information that may be created, maintained, and/or updated within the WMC device 102. The WMC device 102 may be enabled to utilize other applications in the WMC device 102 when creating and/or updating the context tags, and to update any such preference information in the WMC device 102. In an exemplary embodiment of the invention, the WMC device 102 may be enabled to utilize scheduling or calendar applications such as Microsoft Outlook® when creating context data tags to ascertain whether a picture file was created during a business meeting. Additionally, the WMC device 102 may utilize user preference information in generating the context data tags. The user preference information may comprise information that may be specific to a user of the WMC device 102. Notwithstanding, the invention may not be so limited and other criteria may be utilized. For example, the type of tags generated may be dependent on the time of day, location, an event, biometric information and/or other factors. The user preference information may enable determining specific types of information that the user may prefer to be utilized in creating the context data tags. For example, the user preference information may indicate that a user of the WMC device 102 may only desire utilizing subject information and no-location information in creating context data tags for multimedia data files.

To provide security and/or reduce various burdens related with local storage, the WMC device 102 may utilize the remote device 104 for storage of multimedia data files created and/or maintained in the WMC device 102. The WMC device 102 may transmit any such multimedia data files to the remote device 104. The WMC device 102 may communicate directly with the remote device 104 to facilitate transmission of multimedia data files. Alternatively, the WMC device 102 may utilize the connecting system 106 to communicate the multimedia data files to the remote device 104. The remote device 104 may utilize context data tags when storing any such multimedia data files to allow easy and quick access and searchability of stored multimedia data files.

When storing multimedia data files received from the WMC device 102, the remote device 104 may also utilize context data tags for cataloging purposes. For example, the remote device 104 may catalog multimedia data files based on location information, personal information, and/or subject information that may be derived from the context data tags. Cataloging multimedia data files received from the WMC device 102 based on context data tags may enable advanced features such as searchability and/or usability by the WMC device 102 and/or by users that may access the remote device 104 directly.

Figure 2A:
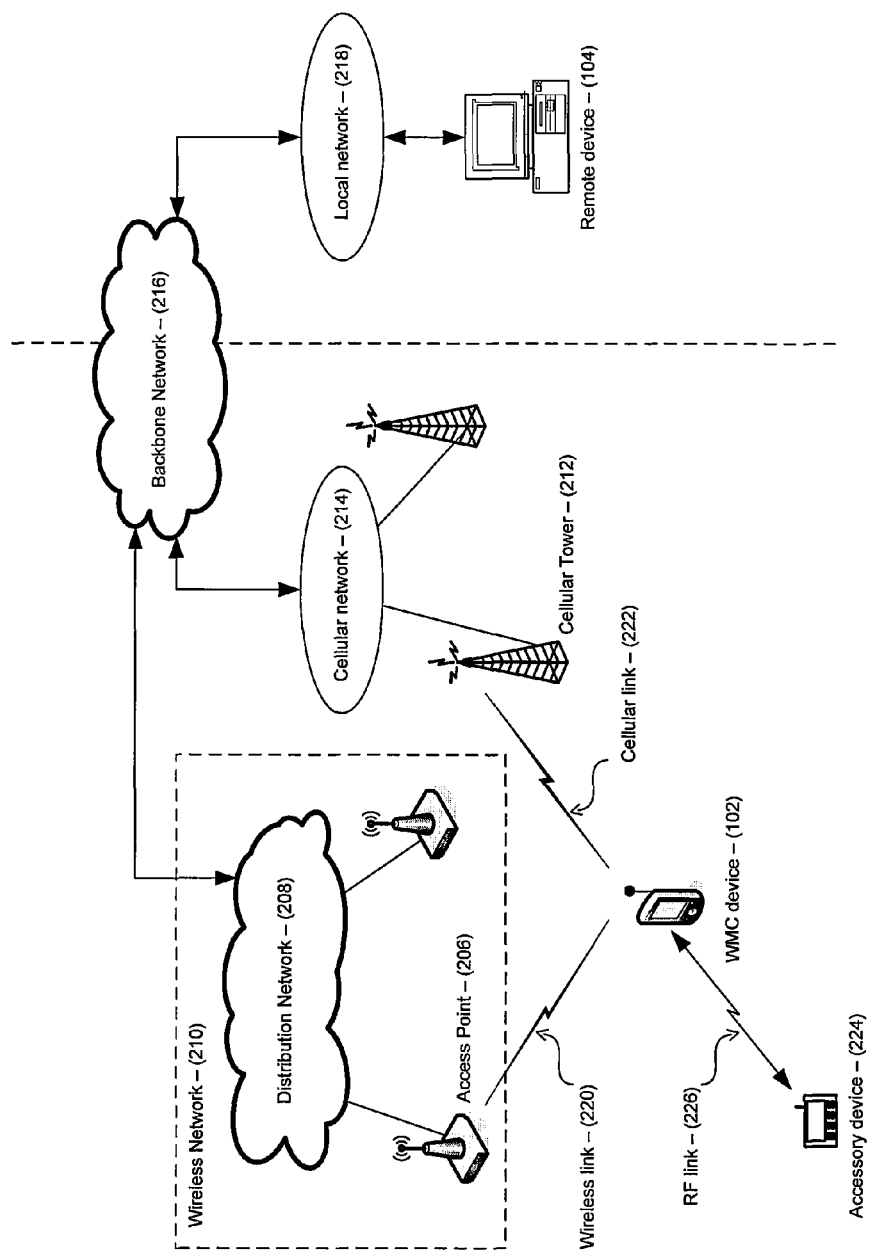
FIG. 2A is a block diagram that illustrates an exemplary system, which may utilize context data tags to catalog data, in accordance with an embodiment of the invention.

FIG. 2A is a block diagram that illustrates an exemplary system, which may utilize context data tags to catalog data, in accordance with an embodiment of the invention. Referring to FIG. 2A, there is shown the WMC device 102, the remote device 104, an access point 206, a distribution network 208, a wireless network 210, a cellular tower 212, a cellular network 214, a backbone network 216, a local network 218, a wireless link 220, a cellular link 222, an accessory device 224, and a RF link 226.

The wireless network 210 may comprise a plurality of the access point 206, the distribution network 208 and suitable hardware, logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 206 may comprise suitable hardware, logic, circuitry, and/or code that may be utilized to provide the necessary access infrastructure for the WMC device 102 to access the wireless network 210. The distribution network 108 may comprise suitable logic, circuitry, and/or code that may be adapted to operate as a backbone network that may be responsible for transport and link functionality for a plurality of access points in the wireless network 210.

The cellular network 214 may comprise plurality of the cellular tower 212 or base stations, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 224 may comprise suitable hardware, logic, circuitry and/or code that may enable performing some accessory functionality in conjunction with the use of the WMC device 102. For example, the accessory device may comprise a hands-free headset. The WMC device 102 may interact with the accessory device 224 over a short-range RF link 226, for example. The RF link 226 may utilize, for example, a standardized technology for inter-device short range communication. For example, the RF link 226 may correspond to a Bluetooth® connection or ZigBee connection between the accessory device 224 and the WMC device 102.

The local network 218 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 216 may comprise suitable logic, circuitry, and/or code that may be adapted to provide overall system connectivity between sub-networks. The backbone network 216 may be enabled to interact with, and connect different wired and/or wireless technologies. For example, the backbone network 216 may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 220 to access the wireless network 210 via the access point 206. The WMC device 102 may also utilize the cellular link 222 to access the cellular network 214 via the cellular tower 212. The WMC device 102 may attempt to communicate with the remote device 104 via the wireless network 210 through the access point 206 and the distribution network 208. The distribution network 208 may enable forwarding messaging and/or data sent from, and to the WMC device 102. The backbone network 216 may enable connectivity between local networks, for example wireless network 210, and cellular network 214. The remote device 104 may receive communication from the WMC device 102 by interacting with the backbone network 216. Necessary protocol-based operations may be performed to facilitate the transmission of information through all the different components. This may comprise use of exemplary protocols such as IP, and SS7.

Once the WMC device 102 establishes connection with the remote device 104, the WMC device 102 may utilize the remote device 104 for secure storage of multimedia data files. The remote device 102 may also be utilized to store multimedia data files that would be accessible by other users directly from the remote device 104. The WMC device 102 may utilize context data tags corresponding to multimedia data files created and/or maintained in the WMC device 102. The context data tags may also be utilized for cataloging multimedia data files by the WMC device 102 and/or by the remote device 104 when storing and/ cataloging such multimedia data files. The context data tags may be created, maintained, and/or utilized for cataloging in the WMC device 102 and/or the remote device 104 in substantially similar manner to the description in FIG. 1.

The WMC device 102 may generate context data tags, which may be utilized to tag multimedia data files that are generated and/or maintained in the WMC device 102 based on their contents. The context data tags may comprise information pertaining to the content of the multimedia data files. For example, the context data tags may comprise the names of persons in a digital pictures, the location where the picture was taken, the time/date when the picture was taken, and/or information pertaining to the subject of the digital picture. The context data tags may be generated as textual data that may be accessed utilizing text-specific application. For example, XML applications. The context data tags may enable convenient access and/or cataloging of the corresponding multimedia data files. The remote device 104 may also utilize the context data tags. When multimedia data files are transmitted from the WMC device 102 to the remote device 104, the context data tags may be transmitted along with the corresponding multimedia data files. For example, where the WMC device 102 transmits multimedia data files to the remote device 104 for secure storage of the multimedia data files, the remote device 104 may utilize received context data tags in the course of storing the received multimedia data files. The remote device 104 may catalog the received multimedia data files received from the WMC device 102 for secure storage based on information read from the files' context data tags. For example, the remote device 104 may catalog multimedia data files based on such information as names of persons in the multimedia data files, the location where the multimedia data files were generated and/or accessed, the time/date when the multimedia data files were generated and/or accessed, and/or information pertaining to the subject of the multimedia data files.

Figure 2B:
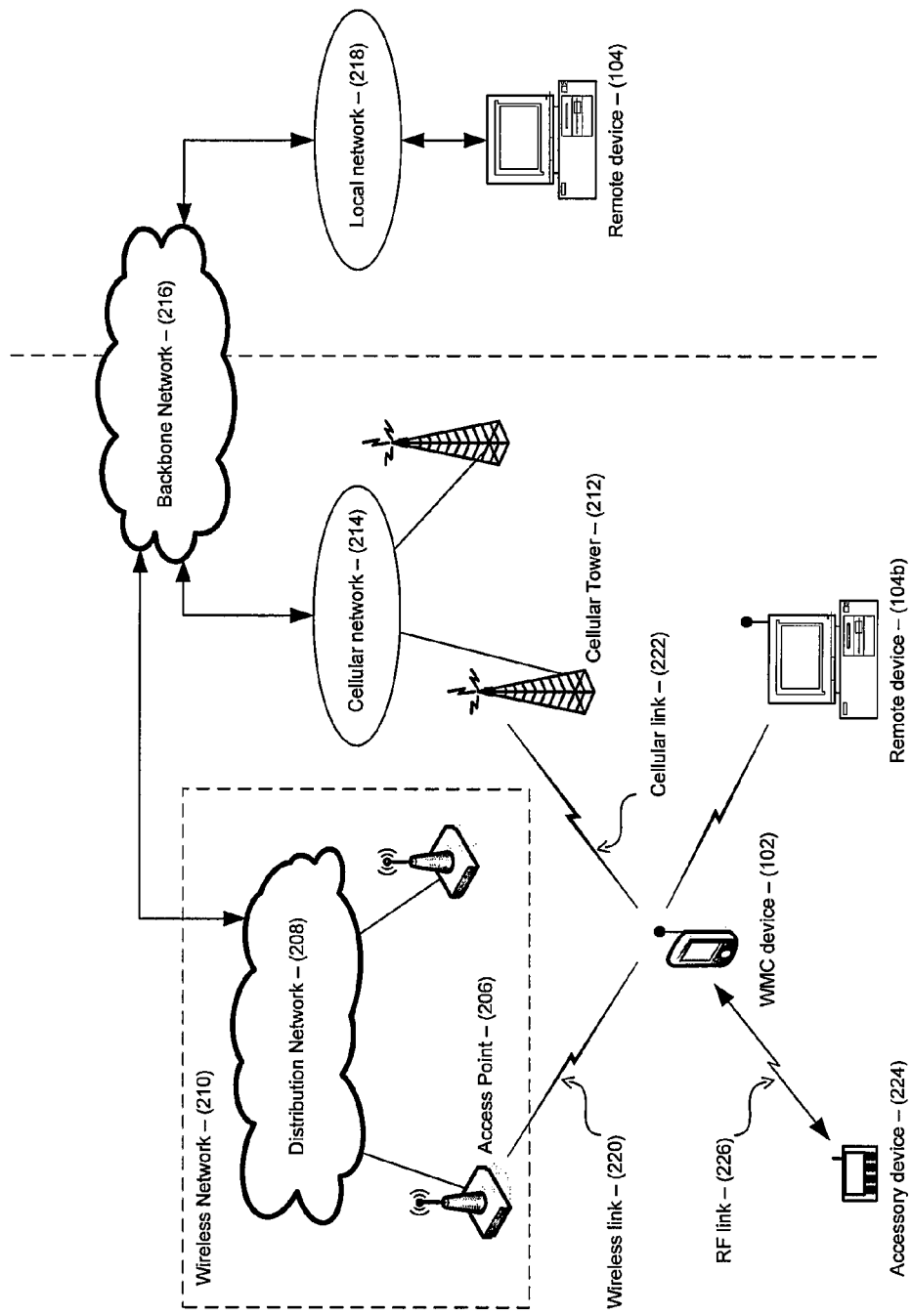
FIG. 2B is a block diagram that illustrates another exemplary system, which may utilize context data tags to catalog data, in accordance with an embodiment of the invention.

FIG. 2B is a block diagram that illustrates another exemplary system, which may utilize context data tags to catalog data, in accordance with an embodiment of the invention. Referring to FIG. 2B, there is shown the WMC device 102, the remote device 104, the access point 206, the distribution network 208, the wireless network 210, the cellular tower 212, the cellular network 214, the backbone network 216, the accessory device 224, the RF link 226, and a remote device 104b.

The remote device 104b may be similar to the remote device 104. However, the remote device 104b may also comprise suitable hardware, logic, circuitry, and/or code that may enable wireless connectivity. The WMC device 102 may communicate directly with the remote device 104b via a wireless connection.

In operation, the WMC device 102, the remote device 104, the access point 206, the distribution network 208, the wireless network 210, the cellular tower 212, the cellular network 214, the backbone network 216, the accessory device 224, and the RF link 226 may operate similar to FIG. 2A. The remote device 104b may operate similar to the remote device 104 as described in FIG. 1 and FIG. 2A. However, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device may have to communicate with the remote device 104 through plurality of connecting networks and/or entities.

The remote device 104b may utilize context data tags. When multimedia data files are transmitted from the WMC device 102 to the remote device 104b, context data tags may be transmitted along with the corresponding multimedia data files. For example, where the WMC device 102 transmits multimedia data files to the remote device 104b for secure storage of the multimedia data files, the remote device 104b may utilize received context data tags in the course of storing the received multimedia data files. The remote device 104b may catalog the received multimedia data files received from the WMC device 102 for secure storage based on information read from the files' context data tags. For example, the remote device 104b may catalog multimedia data files based on such information as names of persons in the multimedia data files, the location where the multimedia data files were generated and/or accessed, the time/date when the multimedia data files were generated and/or accessed, and/or information pertaining to the subject of the multimedia data files.

Figure 3:
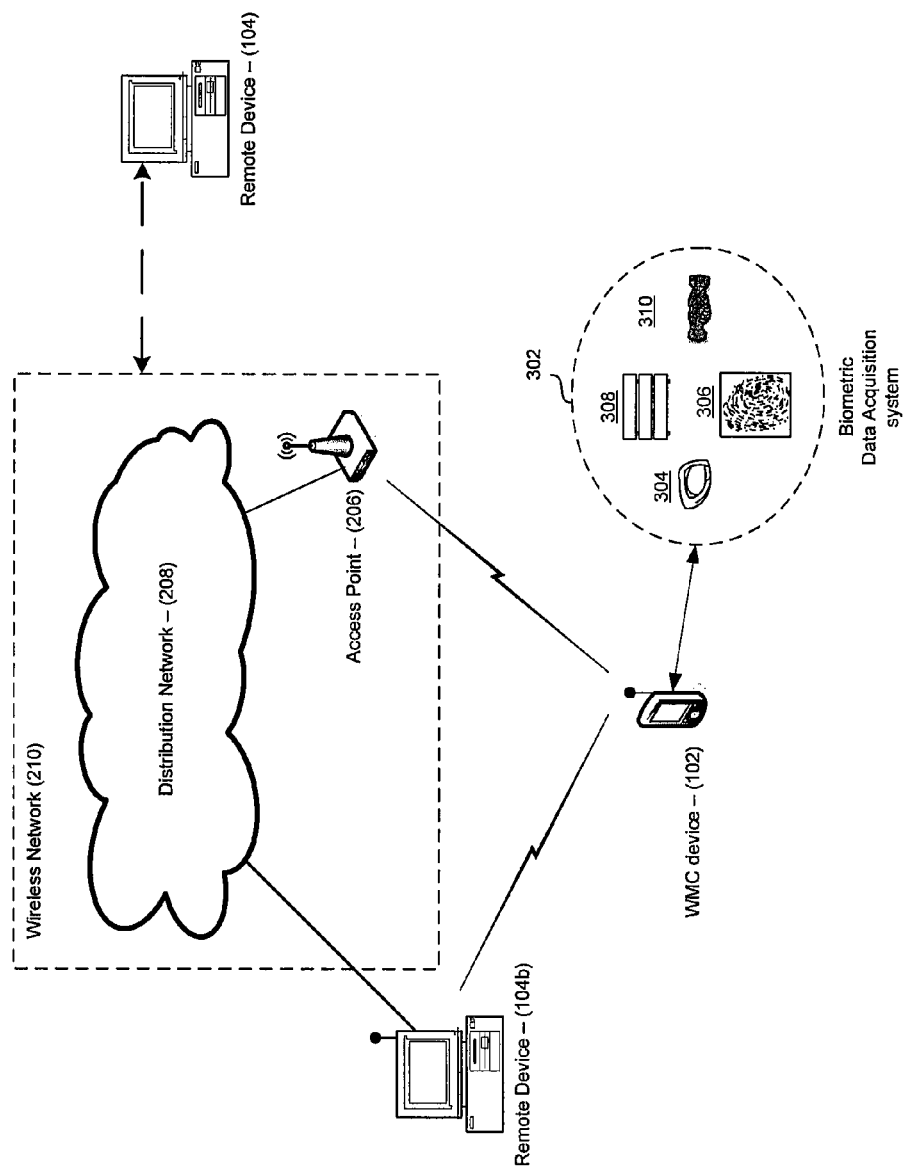
FIG. 3 is a block diagram illustrating a wireless mobile communication (WMC) device utilizing biometric data, in accordance with an embodiment of the invention.

FIG. 3 is a block diagram illustrating a wireless mobile communication (WMC) device utilizing biometric data, in accordance with an embodiment of the invention. Referring to FIG. 3, there is shown the wireless mobile communication (WMC) device 202, the access point 206, the distribution network 208, the wireless network 210, the remote device 104, the remote device 104b, and a biometric data acquisition system 302.

The biometric data acquisition system 302 may comprise a biometric sensor 304, acquired biometric data 306 (from user), a pattern recognition database 308, an authentication and validation procedure 310, and suitable hardware, logic, circuitry and/or code that may enable performing biometric validation and modification procedures. The biometric data, which may comprise finger prints, retina data, or behavioral patterns, may be unique to a person. The biometric data may be classified into two main types: physiological and behavioral biometric data. The physiological biometric data may be related to the physical aspect of the body such as facial features, finger prints, hand shape, iris blood vessel pattern (iris scan) and DNA sequences. The behavioral biometric data may be related to the expression of personality such as Electroencephalogram (EEG) that senses and measures brain wave activities, signature, hand writing and voice. Therefore the biometric data may be representative of the actual person or user.

The biometric sensor 304 may comprise suitable hardware, logic, circuitry and/or code that may enable acquiring user's biometric data in the curse of his or her use of the WMC device 102. An example of the biometric sensor 304 may be a finger print scanner, an iris scanner, hand scanner, brain wave electrodes or a voice coder. The biometric sensory functionality may also be performed utilizing non-dedicated sensors. For example, the WMC device 102 may comprise a microphone that may enable generation of audio recordings, as substantially described in FIG. 1. The microphone may also be utilized to generate voice data that may be utilized in such biometric functionality as speech and/or voice recognition. The acquired biometric data 306 may comprise biometric data acquired by the biometric sensor 304 form the user's prior use of the WMC device 102. For example, the acquired biometric data 306 may comprise the user's finger prints, iris scan, voice pattern, and/or behavioral patterns. The pattern recognition database 308 may comprise suitable logic, circuitry and/or code that may enable storing the acquired biometric data 306. The authentication and validation procedure 310 may comprise suitable hardware, logic, circuitry and/or code that may enable authenticating biometric data read during the use of the WMC device 102 by comparing the read data against the acquired biometric data 306 stored in, and retrieved from the pattern recognition database 308.

In operation, the WMC device 102 may communicate with the remote device 104b via the wireless network 210 by accessing the distribution network 208 through the access point 206. The WMC device 102 may also communicate directly with the remote device 104b over a wireless connection. Alternatively, the WMC device 102 may utilize the wireless network 210 to communicate with the wireless device 104 substantially similar to FIG. 1. Once the WMC device 102 establishes communication with remote devices 104 and/or 104b, the WMC device 102 may transfer multimedia data files present in the WMC 102 device for secure storage for example, substantially as described in FIG. 1.

As substantially described in FIG. 1, the WMC device may utilize context data tags for tagging multimedia data files that may be generated and/or maintained in the WMC device; and these tagged data fails may be transferred to the remote devices 104 and/or 104b, for example, for secure storage. The WMC 102 device 102 may utilize user preference information in tagging data generated, stored, and/or maintained in the WMC device 102, or transferred to the remote devices 104 and 104b. The WMC device 102 may generate context data tags, which may be utilized to tag multimedia data files that are generated and/or maintained in the WMC device 102 based on their contents. The context data tags may comprise information pertaining to the content of the multimedia data files. For example, the context data tags may comprise the names of persons in a digital picture, the location where the picture was taken, the time/date when the picture was taken, and/or information pertaining to the subject of the digital picture. The context data tags may be generated as textual data that may be accessed utilizing text-specific application. For example, XML applications. The context data tags may enable convenient access and/or cataloging of the corresponding multimedia data files in the WMC device 102, and in the remote devices 104 and/or 104b.

The WMC device 102 may utilize the biometric acquisition system 302 in tagging data and/or in updating the user preference information. For example, the WMC device 102 may utilize voice recognition technique to identify an audio file created by the WMC device 102 user by creating a context data tag that may comprise the name of the speaker. Also, the WMC device 102 may utilize behavioral pattern recognition to ascertain and/or predict specific parameters within the user preference information. For example, the WMC device 102 may utilize behavioral pattern recognition techniques to predict that certain actions performed on the WMC device 102 at certain times, dates, and/or locations correlate to some specific activity that may be personal, business, or leisure in nature. Such knowledge may then be utilized when tagging data generated, accessed, and/or maintained in matched situations with the appropriated tags for future cataloging and/or storage. For example, the WMC device 102 may utilize in creating of context data tags information from location application, calendar and/or scheduling information, and EEG reading. The WMC device 102 may determine that digital video files generated and/or accessed while the user is using the WMC device 102 at home, during the weekend, and while the user's brain wave activities are b than normally sensed during business activities, are to be tagged to indicate that the video files are family-related. Accordingly, the context data tags for said video files may comprise "family-weekend" in the subject information.

Figure 4A:
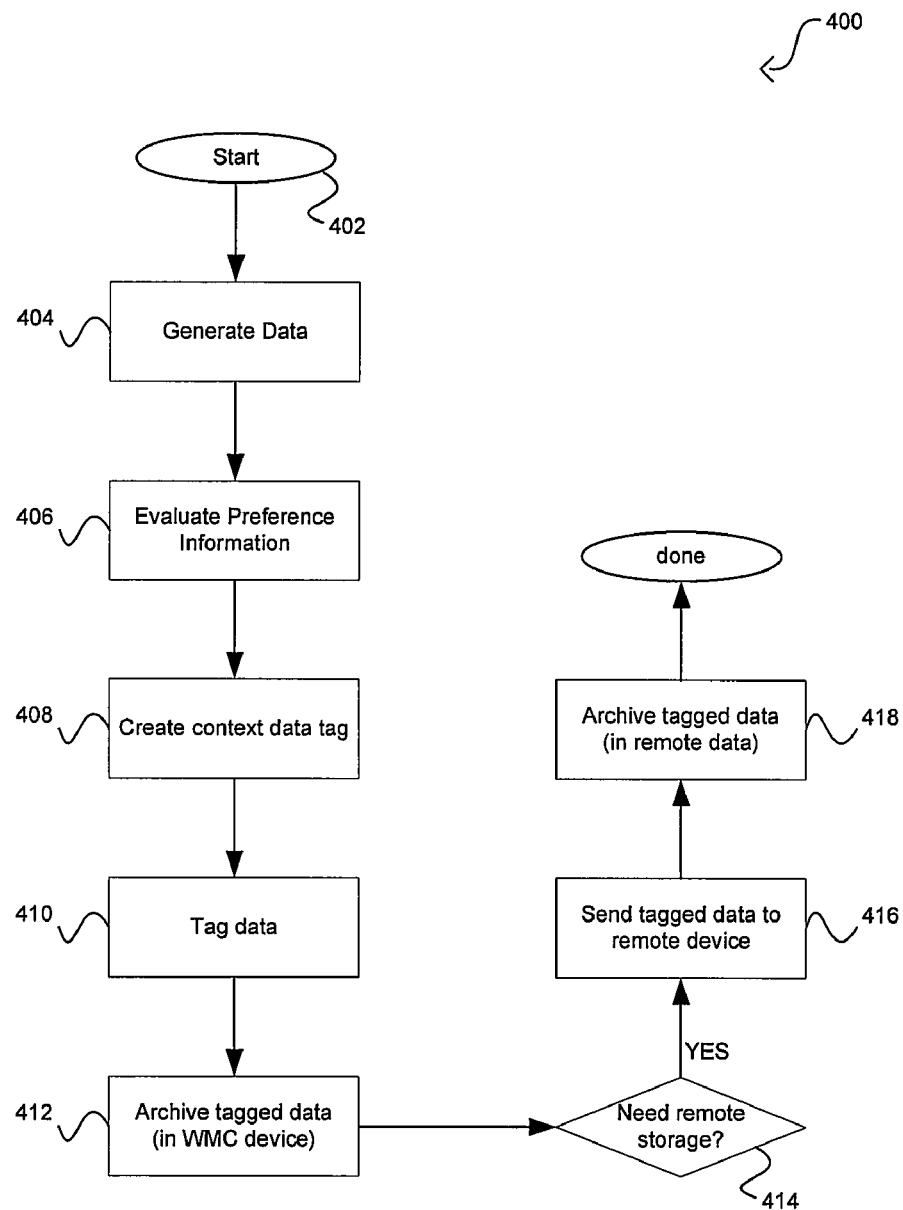
FIG. 4A is a flow diagram that illustrates use of context data tags in data tagging and archiving operations, in accordance with an embodiment of the invention.

FIG. 4A is a flow diagram that illustrates use of context data tags in data tagging and archiving operations, in accordance with an embodiment of the invention. Referring to FIG. 4A, there is shown a flow chart 400. In step 402, the process starts. The WMC device 102 may be utilized for performing some task which may be a non-communicative task. For example, the WMC device 102 may be utilized to create picture files. In 404, multimedia data files may be generated and/or modified in the WMC device in the course of performing the task in step 402. This may comprise creating a multimedia file, such as an audio clip, a video clip, a picture, and/or other possible outcome of performing jobs on the WMC device. In step 406, an evaluation of the user preference information may be performed. This may comprise step 450 as substantially described with respect to FIG. 4B. In step 408, user preference information may comprise individualized information stored and/or maintained by the WMC device 102 to enable improved and dynamic tracking of data generated and/or updated on the WMC device 102. For example, the user preference information may be based on repetitive operations by the users at certain times and/or locations. The user preference information may also be correlated to specific activities that may be ascertained from some scheduling or calendar application running in the WMC device 102, for example Microsoft Outlook®.

In step 408, a context data tag may be created for the generated data. The context data tag is a tag that allows improved cataloging and searchability of the generated data. The context data tag may comprise such information as time and/or date stamp, location stamp, which may be ascertained using such application as GPS services, and other information that may be derived from the user preference information. User preference information may enable ascertaining the context of the use of the WMC device 102 to generate the data, for example, whether the WMC device 102 use pertains to business or personal purpose. In step 410, the context data tag is used to tag the generated data. In step 412, the tagged data is archived in the WMC device 102. The context data tag allows improved archiving of the tagged data by providing expansive criteria for conducting the archiving. The context data tags may comprise information pertaining to the content of the multimedia data files. For example, the context data tags may comprise the names of persons in a digital pictures, the location where the picture was taken, the time/date when the picture was taken, and/or information pertaining to the subject of the digital picture. Because the context data tags may be generated as text data, it may enable easier cataloging of multimedia data files since the contents of the multimedia data files need not be utilized in performing said cataloging.

In accordance with various embodiments of the invention, the use of the context data tags may enable data to be grouped based on correlation between data generation and device use when the data was generated in addition to other factors that make the cataloging more focused, for example, location information. In step 414, a check whether there is need for remote storage. The remote device 104 may offer improved storage capabilities and/or security than the WMC device 102. In instances where it may be determined that there is need for remote storage, the process may proceed to step 416. In step 416, the tagged data may be communicated from the WMC device 102 to the remote device 104. In step 418, the tagged data may be archived in the remote device 104. Archiving in the remote device 104 may be improved in a similar fashion to the archiving improvement achieved in the WMC device 102 as described in step 412, wherein use of context data tags may enable quicker cataloging of said data rather then having to utilize content of the multimedia data files.

Figure 4B:
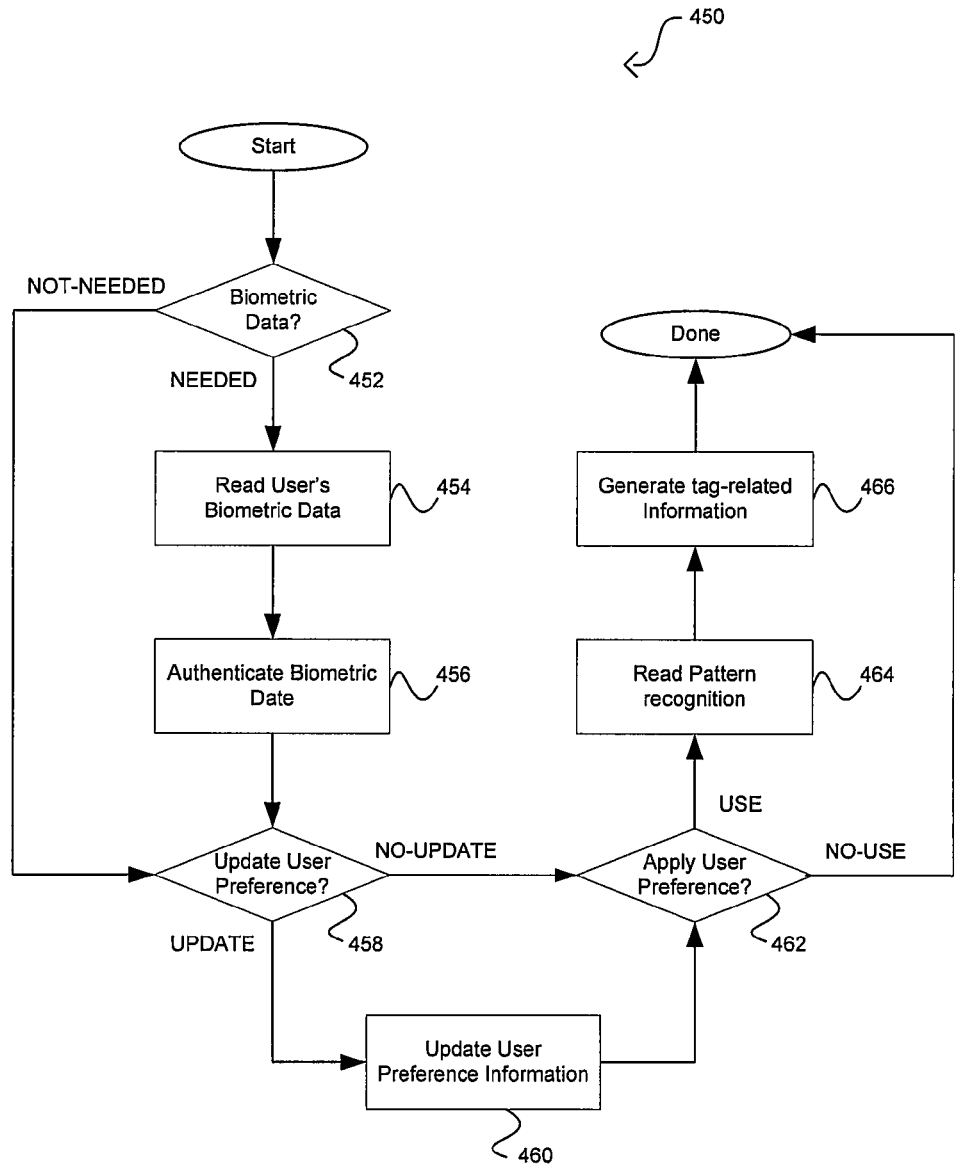
FIG. 4B illustrates exemplary steps for utilizing and/or updating user preference information while tagging multimedia data files in a Wireless Mobile Communication (WMC) device, in accordance with an embodiment of the invention.

FIG. 4B illustrates exemplary steps for utilizing and/or updating user preference information while tagging multimedia data files in a Wireless Mobile Communication (WMC) device, in accordance with an embodiment of the invention. Referring to FIG. 4B, there is shown process 450. The process may be initiated whenever user preference information may be utilized and/or updated, and/or biometric techniques are applied. In step 452, a determination of whether biometric data is necessary may be performed. This may be necessary because the user preference information may comprise fields that may be generated and/or modified without utilizing the biometric system 302. The user preference information may comprise information derived from only from scheduling and location application wherein an activity performed in a certain location, at a certain time/date may be determined of specific nature regardless any biometric readings. For example, the user preference information in WMC device 102 may be updated to enable tagging any multimedia data generated in New York City on non-weekend day, between 9:00 AM and 5:00 PM, as business-related data. In instances where it may be determined in step 452 that biometric data may not be needed, the exemplary steps may proceed to step 458.

In instance where it may be determined in step 452 that biometric data may be needed, the exemplary steps may proceed to step 454. In step 454, the WMC device 102 user's biometric information may be read. This may comprise utilizing the biometric data acquisition system 302 substantially as described with respect to FIG. 3. In step 456, an authentication and validation procedure 310 of the read biometric data may be performed. The outcome of the authentication and validation procedure may be necessary in situations where security is an important factor. For example, where access to certain multimedia data files maintained in the WMC device 102 may be limited exclusively to the user.

In step 458, a determination of whether the user preference information needs to be updated may be performed. For example, the present business-related time/location pairs may not comprise business-related activities in New York City for instance. The WMC device 102 may determines that the device user is using the WMC device 102 in New York City; the WMC device 102 may determine based on scheduling information and/or biometric data derived from EEG sensor for instance that the activity is business-related. Consequently, the WMC device 102 may determine whether to add a new pairing with New York City as a location for business-related activities to user preference information or not. In instances where the user preference needs to be updated, the process may proceed to step 460. In step 460, the user preference information may be updated based on read biometric information and/or other information at the time. For example, where user preference information correlates sets of time/location pairs to a specific activity and/or biometric data, and new pair, based on new time and/or location, may be added to the list. For example, New York City may be added as a location where business activities may be conducted. Subsequently, multimedia data generated in New York City may be tagged as business-related data based on the updated user preference information.

Returning to step 458, in the instance that the outcome of step 458 is NO-UPDATE, the process may proceed to step 462. In step 462, a determination of whether the user preference information may be used for tagging purposes may be performed. In instances where the user preference information does not need to be utilized, the process is done.

In instances where the user preference information needs to be utilized, the process may proceed to step 464. In step 464, pattern recognition information may be read from the pattern recognition database 308. This information, along with non-biometric sub-fields in the user preference information may be utilized for tagging purposes. In step 466, tag-related information may be generated. The generated information may consist of information generated utilizing user preference information, including biometric data. The generated tag-related information may comprise such information as time stamps, user/person identification information. The tag-related information may be utilized in creating the context data tags as substantially described in FIG. 1, and in step 408 of FIG. 4A.

Various embodiments of the invention may comprise a method and system for utilizing context data tags to catalog data in wireless system. A Wireless mobile communication (WMC) device 102 may maintain user preference information, which may be unique to the WMC device 102 capabilities and the WMC device user. The WMC device 102 may modify and/or update the user preference information based on device use and information ascertained from application running on the WMC device itself; for example time management, scheduling and/or calendar application such as Microsoft Outlook®. The user preference information may be used in conjunction with other information to create context data tags for generated data on the WMC device 102. Other exemplary information may comprise, for example, time/date stamping, and location information based on such applications as GPS. The context data tags may be used to tag the generated data allowing continuous and improved cataloging on the WMC device 102. Improved cataloging may enable improved searchability of tagged data. The tagged data alternatively and/or additionally may be stored on a remote device 104 for improved and secure back-up storage.

Another embodiment of the invention may provide a machine-readable storage, having stored thereon, a computer program having at least one code section executable by a machine, thereby causing the machine to perform the steps as described herein for utilizing context data tags to catalog data in wireless system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in wireless devices, the method comprising:
   generating user preference information based on biometric data associated with a particular user of a wireless mobile communication device, wherein said user preference information comprises location stamping associated with a location of said wireless mobile communication device during said generation and/or maintenance of said data;
   updating said user preference information based on device utilization information associated with said wireless mobile communication device;
   tagging data in said wireless mobile communication device with context data tags based on said user preference information while said data is being generated and/or maintained in said wireless mobile communication device; and
   cataloging said tagged data in said wireless mobile communication device utilizing said context data tags.

2. The method according to claim 1, wherein said user preference information is stored in said wireless mobile communication device.

3. The method according to claim 1, wherein at least a portion of said user preference information is stored external to said wireless mobile communication device.

4. The method according to claim 1, comprising transferring said tagged data to a remote device.

5. The method according to claim 1, wherein said user preference information comprises time and/or date stamp associated with said data.

6. The method according to claim 1, wherein said device utilization information comprises information associated with one or more applications utilized in conjunction with said generation and maintenance of said data.

7. The method according to claim 4, comprising storing said transferred tagged data in said remote device.

8. The method according to claim 4, wherein said context data tags is utilized in said remote device in operations performed on said transferred tagged data.

9. The method according to claim 8, wherein said transferred tagged data is catalogued in said remote device utilizing said context data tags.

10. The method according to claim 6, wherein said one or more applications comprise a calendar application and a scheduling application.

11. A system for handling data in wireless devices, the system comprising:
    at least one processor in a wireless mobile communication device that generates user preference information based on biometric data associated with a particular user of a wireless mobile communication device, wherein said user preference information comprises location stamping associated with a location of said wireless mobile communication device during said generation and/or maintenance of said data;
    said at least one processor modifies said user preference information based on device utilization information associated with said wireless mobile communication device, wherein said device utilization information further comprises information associated with one or more applications utilized in conjunction with generation of said data;
    said at least one processor tags data with context data tags based on said user preference information while said data is being generated and/or maintained in said wireless mobile communication device; and
    said at least one processor catalogs said tagged data in said wireless mobile communication device utilizing said context data tags.

12. The system according to claim 11, wherein said user preference information is stored in said wireless mobile communication device.

13. The system according to claim 11, wherein at least a portion of said user preference information is stored external to said wireless mobile communication device.

14. The system according to claim 11, wherein said at least one processor transfers said tagged data to a remote device.

15. The system according to claim 11, wherein said user preference information comprises time and/or date stamp associated with said data.

16. The system according to claim 11, wherein said one or more applications comprise a calendar application and a scheduling application.

17. The system according to claim 14, wherein said at least one processor enables storing said transferred tagged data in said remote device.

18. The system according to claim 14, wherein said context data tags is utilized in said remote device in operations performed on said transferred tagged data.

19. The system according to claim 18, wherein said transferred tagged data is catalogued in said remote device utilizing said context data tags.

20. A system, comprising:
    one or more circuits for use in a biometric acquisition system, said one or more circuits being operable to acquiring biometric data associated with a particular user during use of a mobile device by said particular user;
    said one or more circuits are operable to validate said acquired biometric data, by comparing said acquired biometric data with stored biometric data associated with said particular user;
    said one or more circuits are operable to generate user preference information based on biometric data associated with said particular user of said mobile device, wherein said user preference information comprises location stamping associated with a location of said wireless mobile communication device during said generation and/or maintenance of said data;
    said one or more circuits are operable to update said user preference information based on device utilization information associated with said mobile device; and
    said one or more circuits are operable to determine tagging preferences associated with said particular user and generate tags for data associated with said particular user based at least in part on said tagging preferences.

21. The system according to claim 20, wherein said acquired biometric data is based on finger print, iris scan, voice pattern, and/or behavioral pattern.

* * * * *